(12) United States Patent
Gao et al.

(10) Patent No.: US 8,204,184 B2
(45) Date of Patent: *Jun. 19, 2012

(54) WEB INTEGRATED INTERACTIVE VOICE RESPONSE

(75) Inventors: Xiaofeng Gao, Alpharetta, GA (US); David Scott, Norcross, GA (US); Sam Zellner, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1200 days.

This patent is subject to a terminal disclaimer.

(21) Appl. No.: 11/961,005

(22) Filed: Dec. 20, 2007

(65) Prior Publication Data

US 2008/0109226 A1    May 8, 2008

Related U.S. Application Data

(60) Division of application No. 11/113,765, filed on Apr. 25, 2005, now Pat. No. 7,324,633, which is a continuation-in-part of application No. 10/159,825, filed on May 30, 2002, now Pat. No. 6,885,737.

(51) Int. Cl.
*H04M 11/06* (2006.01)
*G06F 3/00* (2006.01)
*G10L 11/00* (2006.01)

(52) U.S. Cl. ............... 379/88.18; 379/88.17; 379/93.09; 379/93.17; 379/93.25; 379/265.01; 704/270.1; 704/275; 709/206; 709/227; 715/728

(58) Field of Classification Search ............... 379/88.17, 379/88.18, 93.09, 993.17, 93.25, 265.01, 379/52, 88.11, 88.13, 88.22, 93.17; 704/270.1, 704/275; 709/206, 227; 715/728; 340/538.11; 455/410, 456.1; 705/2
See application file for complete search history.

(56) References Cited

U.S. PATENT DOCUMENTS

| | | | | |
|---|---|---|---|---|
| 5,583,922 A * | 12/1996 | Davis et al. | ............... | 379/93.09 |
| 5,737,393 A * | 4/1998 | Wolf | ............... | 379/88.13 |
| 5,802,526 A * | 9/1998 | Fawcett et al. | ............... | 379/88.13 |
| 5,912,952 A * | 6/1999 | Brendzel | ............... | 379/93.25 |
| 6,049,712 A * | 4/2000 | Wallinder | ............... | 455/410 |
| 6,091,805 A | 7/2000 | Watson | | |
| 6,385,646 B1 | 5/2002 | Brown et al. | | |
| 6,400,807 B1 * | 6/2002 | Hewitt et al. | ............... | 379/88.11 |
| 6,441,723 B1 * | 8/2002 | Mansfield et al. | ............... | 340/538.11 |
| 6,456,699 B1 | 9/2002 | Burg et al. | | |
| 6,493,428 B1 * | 12/2002 | Hillier | ............... | 379/67.1 |

(Continued)

OTHER PUBLICATIONS

IBM Technical Disclosure Bulletin, Feb. 1995, US, Voice Augmented Menu Automated Telephone Response System, vol. 38, Issue 2 and pp. 57-62.*
Gao; U.S. Appl. No. 10/159,825, filed May 30, 2002.
Gao; U.S. Appl. No. 11/113,765, filed Apr. 25, 2005.

(Continued)

*Primary Examiner* — Gerald Gauthier
(74) *Attorney, Agent, or Firm* — Greenblum & Bernstein, P.L.C.

(57) ABSTRACT

One embodiment of a representative system for web integrated interactive voice response includes an interactive voice response system adapted to provide a plurality of voice menus to a user over a telephone and a graphical user interface system adapted to provide a plurality of menus in a graphical format to the user over a network connection. Information provided in the voice menus corresponds to information provided in the menus in the graphical format and is responsive to commands received by the graphical user interface system from the user. Other systems and methods are also provided.

18 Claims, 14 Drawing Sheets

U.S. PATENT DOCUMENTS

| | | | |
|---|---|---|---|
| 6,690,654 B2 | 2/2004 | Elliott et al. | |
| 6,697,460 B2 * | 2/2004 | Knott et al. | 379/88.22 |
| 6,832,196 B2 | 12/2004 | Reich | |
| 6,850,949 B2 * | 2/2005 | Warner et al. | 1/1 |
| 6,868,140 B2 * | 3/2005 | Myers et al. | 379/67.1 |
| 6,885,737 B1 * | 4/2005 | Gao et al. | 379/93.17 |
| 6,920,425 B1 * | 7/2005 | Will et al. | 704/275 |
| 7,054,939 B2 | 5/2006 | Koch et al. | |
| 7,289,606 B2 * | 10/2007 | Sibal et al. | 379/52 |
| 7,324,633 B2 * | 1/2008 | Gao et al. | 379/88.18 |
| 7,664,509 B2 * | 2/2010 | Zellner et al. | 455/456.1 |
| 7,908,381 B2 * | 3/2011 | Koch et al. | 709/227 |
| 8,077,840 B2 * | 12/2011 | Gao et al. | 379/88.18 |
| 2003/0002651 A1 * | 1/2003 | Shires | 379/265.01 |
| 2003/0005076 A1 | 1/2003 | Koch et al. | |
| 2003/0112931 A1 | 6/2003 | Brown et al. | |
| 2003/0133548 A1 | 7/2003 | Lee et al. | |
| 2003/0174814 A1 | 9/2003 | Diacakis | |
| 2003/0179743 A1 | 9/2003 | Bosik et al. | |
| 2005/0207545 A1 * | 9/2005 | Gao et al. | 379/88.17 |
| 2006/0149587 A1 * | 7/2006 | Hill et al. | 705/2 |
| 2006/0200532 A1 * | 9/2006 | Skladman et al. | 709/206 |
| 2008/0098306 A1 * | 4/2008 | Gao et al. | 715/728 |
| 2008/0109226 A1 * | 5/2008 | Gao et al. | 704/270.1 |

OTHER PUBLICATIONS

Gao; U.S. Appl. No. 11/960,103, filed Dec. 19, 2007.
Gao; Non-Final Rejection mailed Oct. 7, 2003; U.S. Appl. No. 10/159,825, filed May 30, 2002.
Gao; Non-Final Rejection mailed Apr. 8, 2004; U.S. Appl. No. 10/159,825, filed May 30, 2002.
Gao; Examiner Interview Summary Record mailed Jun. 3, 2004; U.S. Appl. No. 10/159,825, filed May 30, 2002.
Gao; Notice of Allowance and Fees Due mailed Sep. 23, 2004; U.S. Appl. No. 10/159,825, filed May 30, 2002.
Gao; Notice of Allowance and Fees Due mailed Feb. 23, 2005; U.S. Appl. No. 10/159,825, filed May 30, 2002.
Gao; Non-Final Rejection mailed Jan. 20, 2006; U.S. Appl. No. 11/113,765, filed Apr. 25, 2005.
Gao; Non-Final Rejection mailed Jul. 19, 2006; U.S. Appl. No. 11/113,765, filed Apr. 25, 2005.
Gao; Non-Final Rejection mailed Jan. 8, 2007; U.S. Appl. No. 11/113,765, filed Apr. 25, 2005.
Gao; Final Rejection mailed Jun. 4, 2007; U.S. Appl. No. 11/113,765, filed Apr. 25, 2005.
Gao; Notice of Allowance and Fees Due mailed Oct. 3, 2007; U.S. Appl. No. 11/113,765, filed Apr. 25, 2005.

* cited by examiner

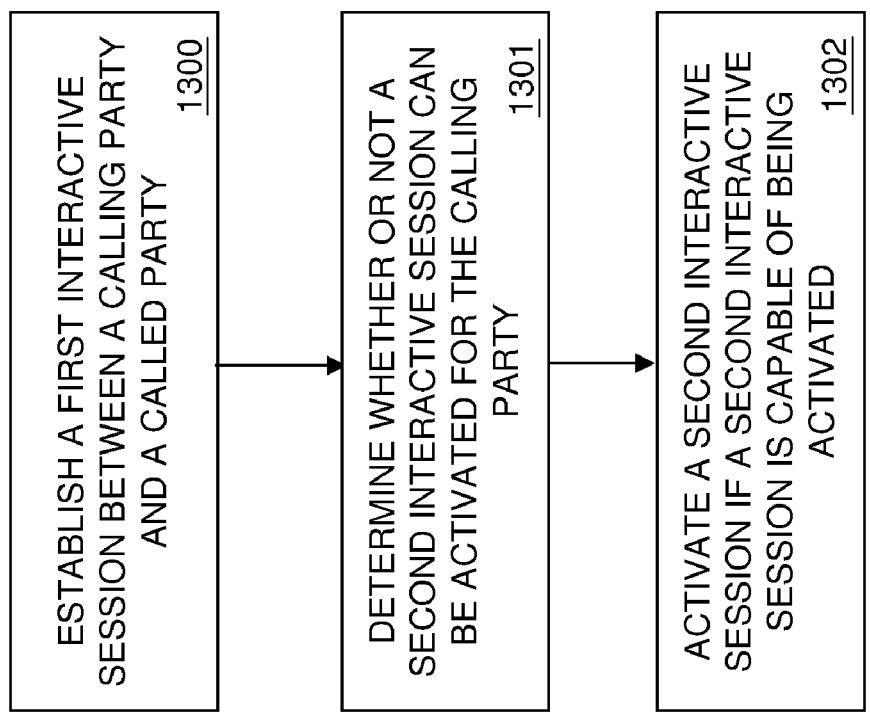

WEB INTEGRATED INTERACTIVE VOICE RESPONSE

CROSS-REFERENCE TO RELATED APPLICATION

This application is a divisional of U.S. utility application entitled "Web Integrated Interactive Voice Response," having Ser. No. 11/113,765, filed Apr. 25, 2005, which is a continuation-in-part of U.S. utility application entitled, "Web Integrated Interactive Voice Response," having Ser. No. 10/159,825, filed May 30, 2002, now U.S. Pat. No. 6,885,737. The foregoing applications are entirely incorporated herein by reference.

BACKGROUND

The present disclosure is generally related to telecommunications and more particularly to the integration of interactive voice response systems and web browsers.

The telecommunications industry has undergone rapid changes in the past several years. With the development of the advanced intelligent network (AIN), telephone companies are poised to offer a multitude of new services to subscribers. One service that many telephone service providers now offer is a call center, which can be facilitated by the AIN. One example of an AIN is further described in U.S. Pat. No. 5,701,301 and U.S. Pat. No. 5,838,774, each of which is hereby incorporated by reference. The call center can comprise an interactive voice response (IVR) system that interacts with a calling party over the telephone network through dual-tone multi-frequency (DTMF) of DTMF signaling in the public switched telephone network (PSTN).

IVR systems in particular have allowed telephone service providers to efficiently host call centers for business customers. An IVR system may be used to dispense or collect information from callers, including pre-classifying calls, thus allowing service representatives to specialize in particular areas, cutting down on the need for live knowledgeable receptionists to receive calls and route them correctly. Alternatively, the entire call may take place over the IVR system, without the need for interaction with a service representative.

However, though these IVR systems may improve efficiency for the employees of the service provider, these systems are often the subject of much frustration with a calling party who may become stranded or confused in the IVR system. The user may not know how to return to the previous menu after choosing the wrong menu, or the user may not know how to replay a menu after missing a choice. Moreover, the voice menu may seem endless to the calling party because the calling party has no idea at what point he or she will reach a service representative or accomplish the intended objective.

Therefore, there is a need for systems and method that address these and/or other perceived shortcomings of the prior art.

SUMMARY

One embodiment of the present disclosure provides systems and methods for web integrated interactive voice response. One embodiment of a representative system includes an interactive voice response system adapted to provide a plurality of voice menus to a user over a telephone and a graphical user interface system adapted to provide a plurality of menus in a graphical format to the user over a network connection. Information provided in the voice menus corresponds to information provided in the menus in the graphical format and is responsive to commands received by the graphical user interface system from the user.

One embodiment of a representative method includes the following steps: sending a graphical user interface format over a network to the user; and sending a voice menu format to the user, wherein information provided in the voice menu format corresponds to information provided in the graphical user interface format.

Other systems, methods, features, and advantages of the present disclosure will be or become apparent to one with skill in the art upon examination of the following drawings and detailed description. It is intended that all such additional systems, methods, features, and advantages included within this description, be within the scope of the present disclosure.

BRIEF DESCRIPTION OF THE DRAWINGS

The disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 13 is a flowchart showing the operation of one embodiment of the present disclosure, among others.

DETAILED DESCRIPTION

Various embodiments of the disclosure now will be described more fully with reference to the accompanying drawings. Embodiments may be in many different forms and should not be construed as limited to the embodiments set forth herein; rather, these embodiments are intended to convey the scope of the disclosure to those skilled in the art. Furthermore, all "examples" given herein are intended to be non-limiting.

Figure 1:
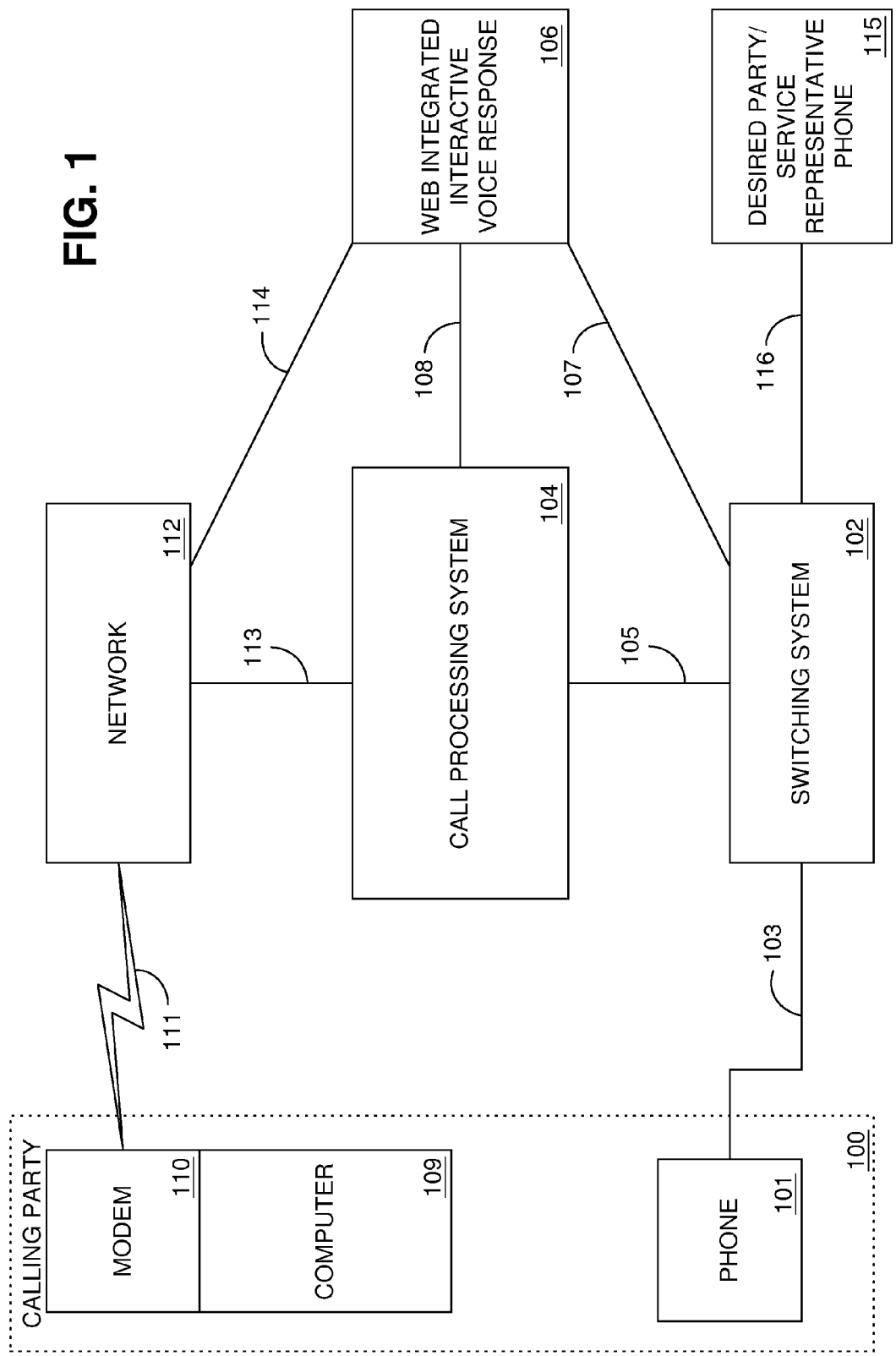
FIG. 1 is a block diagram illustrating a first embodiment, among others, of the present disclosure.

Referring now to FIG. 1, shown is a block diagram of one embodiment, among others, of the present disclosure. In this embodiment a calling party location 100 includes a standard plain-old telephone service (POTS) telephone 101 operating substantially within the POTS frequency range. The POTS frequency range may be defined as the frequency range of 0 to 4 kilohertz (kHz), which contains substantially the range of frequencies which are audible to the human ear.

The telephone 101 may be coupled to a switching system 102 through connection 103. The switching system 102 is operable to connect calls between system subscribers. In order to properly route calls, the switching system 102 may be coupled to a call processing system 104 via connection 105. The call processing system 104 generally includes a customer database. The customer database can include subscriber specific handling information and call routing information. The routing information is used to connect the call to the proper party, while the subscriber specific handling information encompasses the individual services to which the calling or called parties subscribe.

In one embodiment, among others, of the current disclosure, one of the services can include a call center provided by the telephone service provider. A call center may include an IVR which queries the caller, receives feedback, and routes the call to the appropriate service representative. In one embodiment of the present disclosure, the IVR could be a web integrated IVR 106.

The web integrated IVR 106 can receive incoming calls via line 107 and provide an interactive voice response service to the calling party. The web integrated IVR can also send queries to the call processing system via line 108. When an incoming call is received, the web integrated IVR 106 can send a query to the call processing system 104 to determine whether or not the calling party 100 has a computer 109, shown having a modem 110, with an accessible connection 111 to the network 112. The network connection may include, alternatively, a standard modem, a cable modem, a digital subscriber line, an ethernet connection, or any other method which provides computer connectivity to a computer network.

The call processing system 104 is coupled to the network 112 via line 113, and can include a database comprising a list of users with accessible network connections. The call processing system 104 can compile this database through a registration application residing on the calling party computer 109 which sends a registration request through the network 112 to the call processing system 104, connected to the network via line 113. The registration application could be a custom application, or even an instant messaging client residing on the calling party computer 109, among others. Common instant messaging clients, among others, include: MSN Messenger, available from Microsoft, Corp. of Redmond, Wash.; Yahoo! Messenger, available from Yahoo!, Inc. of Sunnyvale, Calif.; AOL Instant Messenger, available from America Online, Inc. of Dulles, Va.; and Jabber Instant Messenger, available from Jabber, Inc. of Denver, Colo. One skilled in the art will further recognize that the Jabber Instant Messenger comprises an open systems architecture. Open systems architectures generally allow a user to manipulate the source program to tailor the client to specific needs of each individual user. Used in this context, the open system architecture could facilitate the development of a custom application to provide a registration with a central user database. In alternative embodiments, each of these alternative text communication applications, among others, are intended to be included within the scope of the present disclosure.

Alternatively, the call processing system 104 could receive the query from the web integrated IVR 106, and relay the query to the network 112. However, in order to do this the web integrated IVR 106 should have access to the applicable network database. Furthermore, the web integrated IVR 106 needs a way to map the calling party's telephone number (or other identification) to a network address. The network service provider providing network access to the calling party may include a database that dynamically assigns network addresses to its users as they log on and log off of the network 112. The network service provider will also include other databases, which can correlate a proper name or telephone number with a username, and ultimately to a network address if the user has a computer 109 connected to the network service provider. Thus, the call processing system 104 will be able to query the network 112 using the proper name of the calling party and receive a network address in response if the user is connected. One skilled in the art will recognize that the web integrated IVR 106 could alternatively send a query directly to the network 112 via line 114 to request information about a particular user's status.

When the web integrated IVR 106 receives a network address signifying that the calling party computer 109 has an accessible network connection, the web integrated IVR 106 can send a pre-recorded voice prompt to the calling party phone 101. The prompt can include a message indicating that there is an accessible network computer 109 and that the menu system is available in either voice menu format or a graphical user interface (GUI) format. Further, the GUI format can automatically be pushed to the computer 109 to facilitate user interaction with the web integrated IVR 106. The web integrated IVR 106 can then request that the calling party choose to continue with the voice menu format or transfer to the GUI format. If the party chooses the voice menu format, a series of pre-recorded voice menus are sent to the calling party telephone 101.

However, if the calling party chooses to receive the GUI format, the web integrated IVR 106 contacts a web server residing on the network 112. The web integrated IVR 106 notifies the web server that the calling party has requested the GUI format. The web integrated IVR 106 can supply the web server with the network address of the calling party computer 109, or alternatively, the web server itself can retrieve the network address of the calling party computer 109.

In alternative embodiments, the web server could "push" a web page to the calling party computer 109 or send a universal resource locator (URL) to the calling party computer 109. Pushing the web page to the calling party computer 109 can be performed by a "webcasting" application residing on the calling party computer, for example. "Push" technology is currently available in a number of forms including, but not limited to: Backweb, available from Backweb Technologies of San Jose, Calif.; Microsoft Internet Explorer, available from Microsoft Corporation of Redmond, Wash.; Netscape Netcaster, available from Netscape Communications Corporation of Mountain View, Calif.; Pointcast, available from Infogate, Inc. of San Diego, Calif. Pushing a URL to the calling party computer 109 can be accomplished using any of the "push" technologies listed above, but may alternatively be accomplished by merely sending the URL to the calling party computer 109 using any of the chat clients listed previously. The URL would provide the calling party computer 109 a link to the web server. Upon selecting the link, the calling party computer 109 would send a request to the web server, initiating a "pull" connection between the web server and the calling party computer 109. The web server would respond by returning a web page corresponding to the GUI format of the menu system.

In an alternative embodiment, among others, the web integrated IVR 106 can include a system to collect information from the user via the GUI format, and connect the calling party telephone 101 to the correct party. This is done by compiling a database according to the calling party's responses to a series of questions posed by the GUI and answers received by the web server. The web server, after collecting the information, could decide who the calling party should be connected to and notify the call processing system 104 to connect a call to the desired party or service representative 115 via a connection 116 through the switching system

102. Alternatively, the web server could notify the web integrated IVR 106 of the responses to the questions posed. The web integrated IVR 106 could then decide the correct disposal of the call and notify the call processing system 104. The call processing system 104 could then instruct the switching system 102 to perform the operation. Moreover, either the web server or the web integrated IVR 106 could be enabled to update a customer database on the call processing system, according to the answers received from the GUI format menu system.

In a second embodiment, among others, of the current disclosure, one of the services of the call processing system 104 can include a web integrated IVR service. In this embodiment, when a calling party places a call, the call request is received at the switching system 102. The switching system 102 queries the call processing system 104 for subscriber specific handling information. The call processing system 104 then queries a telephone service customer profile database to find the services to which the calling party or called party subscribe.

If the called party subscribes to the web integrated IVR service, the call processing system 104 database has a record that indicates that the called party is an IVR system. The call processing system 104 then checks its own database or, alternatively, a network database for accessibility of a network connection 111 associated with the calling party. If the call processing system 104 does not find an accessible network connection 111, the call processing system 104 instructs the switching system 102 to connect the call to the IVR system.

When the call processing system 104 finds an accessible network connection 111, the call processing system 104 preferably sends the calling party a prompt. This prompt can include information about the called IVR system and notification that there is a GUI format menu system corresponding to the called IVR. The call processing system 104 then asks the calling party whether he or she would like to use the GUI format instead of the voice menu format. If the calling party indicates that he or she would like to use the voice menu format, the call processing system 104 instructs the switching system 102 to connect the calling party telephone 101 to the called IVR system. However, if the calling party indicates that he or she would like to use the GUI format, the call processing system 104 instructs a web server to use "push" technologies to deliver a URL or a web page to the calling party computer, or merely send the URL to the calling party via a chat client, among other methods of initiating an interactive session with the calling party computer 109. After receiving the calling party's responses to the GUI, the call processing system 104 may optionally connect the calling party with the desired called party or service representative via a network phone or standard analog phone.

In an alternative embodiment, among others, after finding an accessible network connection 111, the call processing system 104 could pass the calling party computer network address to the called web integrated IVR 106 and establish a connection between the web integrated IVR 106 and the calling party telephone 101. The web integrated IVR 106 could then send a prompt to the user indicating the availability of a GUI format menu, and ask the caller to choose between the voice menu format or the GUI format. If the caller chooses the voice menu format, the standard interactive voice response system would be played. However, if the caller indicates a preference to use the GUI format, the web integrated IVR 106 sends the network address of the calling party's computer 109 to a web server, which contains a preferably similar menu system to that embodied in the voice menu system. The web server then initiates a session with the calling party by sending a URL or pushing a web page to the calling party computer 109, among others. In alternative embodiments, the calling party 100 may save the URL corresponding to the GUI format menu and use the URL at a later date. Further, after receiving the calling party's responses to the GUI format menu, the web integrated IVR 106 may optionally connect the calling party with the desired called party or service representative 115 via a network phone or standard analog phone.

In a third embodiment, among others, of the present disclosure, the web integrated IVR 106 is enabled to query either the network 112 or the call processing system 104 to find the accessibility of a specific calling party network connection 111. In this embodiment, when the switching system 102 receives a call request, and queries the call processing system 104, the calling party telephone 101 will be connected to the web integrated IVR 106. The web integrated IVR will then query a network database or a call processing database using the calling party name and/or telephone number to determine if the calling party has an accessible network connection 111 and determine the network address of the calling party computer 109. If the calling party has an accessible network connection 111, the web integrated IVR 106 will prompt the calling party. The prompt indicates the availability of a GUI format corresponding to the voice menu system, and asks the calling party whether they would like to use the GUI format. If the calling party answers in the negative, the web integrated IVR 106 will proceed in sending the standard voice menu format to the calling party telephone 101. However, if the calling party would like to use the GUI format, the web integrated IVR 106 will send the calling party computer 109 network address to a web server. The web server will initiate a session with the calling party computer 109 by sending a URL to the calling party computer 109, or by pushing a URL or web page to the calling party computer 109. After the calling party completes the interaction with the GUI format menu system, the web integrated IVR 106 may connect the calling party with the desired called party or service representative 115 via network phone or standard analog phone, or update a customer database on the call processing system 104.

Figure 2:
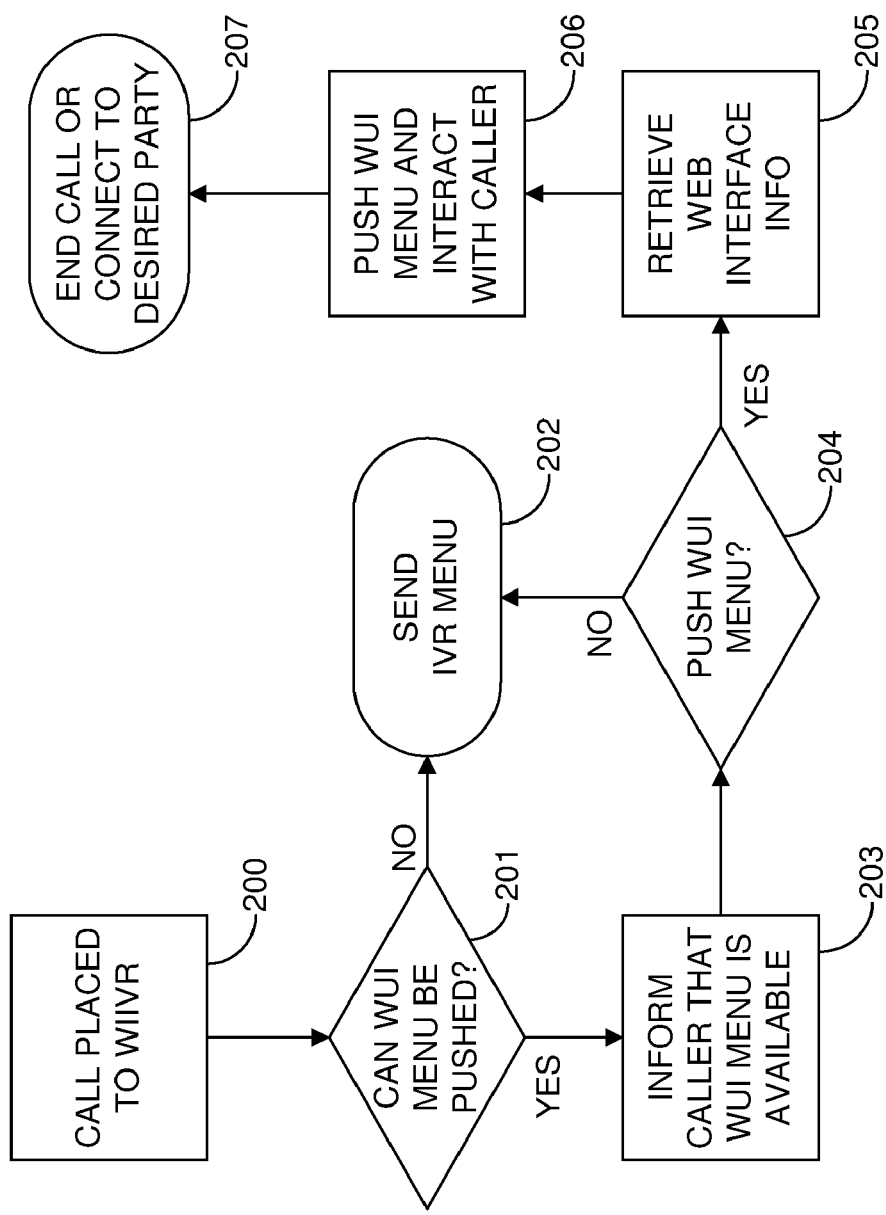
FIG. 2 is a flowchart showing the operation of the first embodiment of the present disclosure, among others.

Referring now to FIG. 2, shown is a flowchart illustrating one embodiment, among others, of a call flow using the system of FIG. 1. At step 200, a call is placed to the web integrated IVR by the calling party. As shown by step 201, the system then determines whether or not the GUI format menu can be pushed to a calling party computer. The GUI format menu can be pushed if a network connection is accessible at a computer associated with the calling party. The accessibility of the network connection can depend upon the presence of a connection and the availability of the calling party. If the network connection is not accessible, then the GUI format menu cannot be pushed, and as shown by step 202, the voice menu is sent to the calling party's telephone.

If a network connection is accessible, the GUI format menu can be pushed, and, as shown by step 203, the system informs the calling party of the availability of a GUI format menu. The system then asks the calling party whether or not he or she would like to use the GUI format menu system, as shown by step 204. If the calling party prefers not to use the GUI format menu system, as shown by step 202, the system sends the standard IVR menu to the calling party telephone.

If the calling party answers affirmatively to using the GUI format menu, the system can retrieve the web interface information, as shown by step 205. This information can include the network address of the calling party, a customized menu system for the specific calling party, and any other information that might be useful in facilitating interaction with the calling party. As shown by step 206, the system then pushes the GUI format menu to the calling party computer. GUI pages may be customized, as is the IVR menu, to the needs of the calling party and to facilitate interaction between the calling party and the GUI format menu. An answer to the current GUI page can result in the next GUI page being sent to the calling party. However, the specific GUI page sent to the calling party depends upon the calling party's response on the current GUI page. Thus, there is true interaction between the calling party and the system. Moreover, the system records the calling party's responses to all previous GUI pages and uses these responses in updating customer databases or connecting a calling party to a desired called party or service representative, as shown by step 207.

Figure 3:
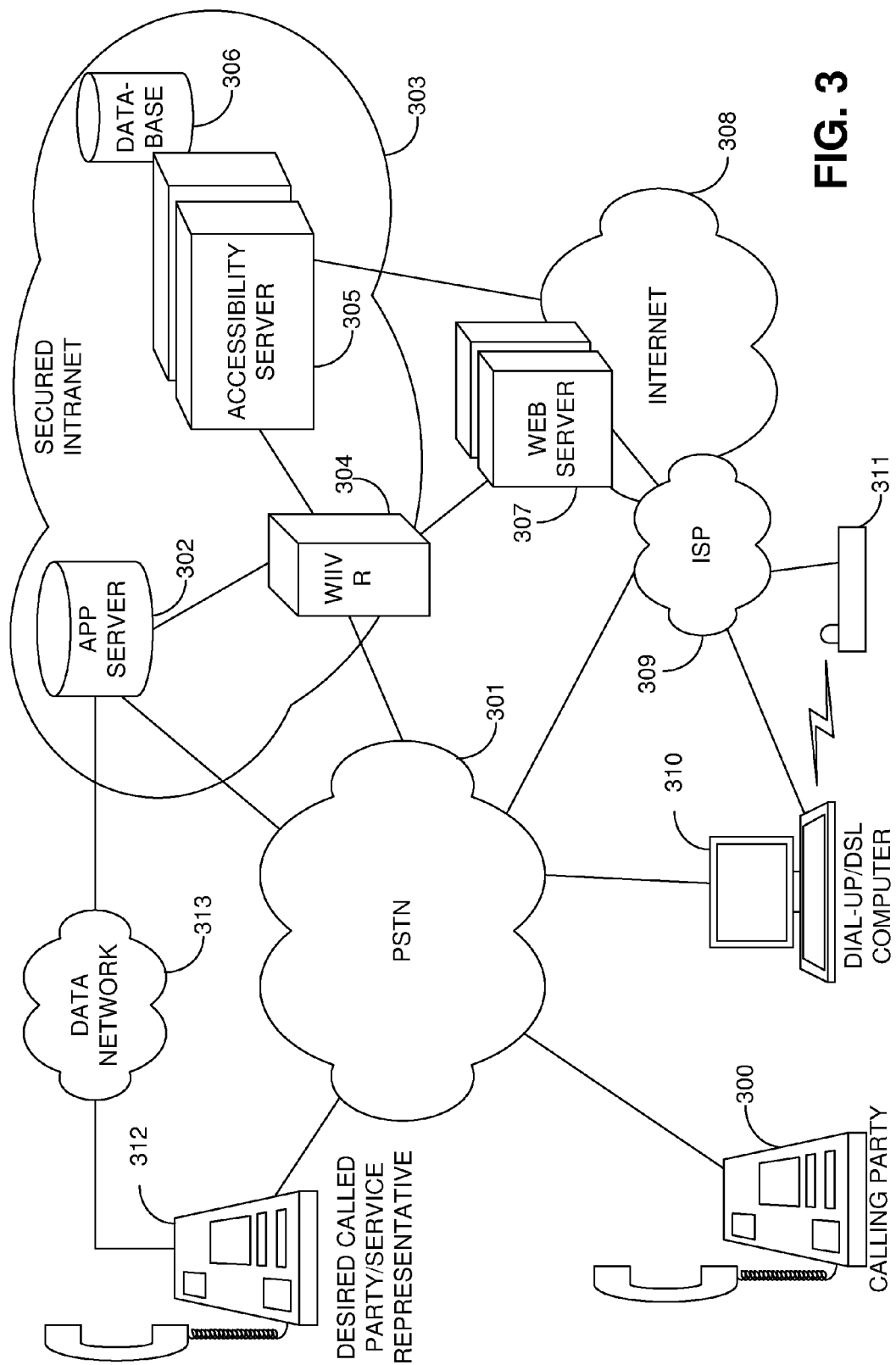
FIG. 3 is a schematic diagram illustrating one embodiment, among others, of the present disclosure.

Referring now to FIG. 3, shown is a schematic diagram of one embodiment, among others, of the present disclosure. A calling party telephone 300 may be coupled to a public switched telephone network (PSTN) 301, which includes a plurality of service switching points (SSPs) and may also employ networks for packet voice networks. The PSTN receives call handling information from an application server 302, such as a service control point (SCP). The application server 302 preferably resides on a secured intranet 303, which can also include an accessibility server 305, an accessibility database 306, and the web integrated IVR 304. In alternative embodiments, the web integrated IVR 304, accessibility server 305, and accessibility database 306 can exist on a separate intranet, among other possible arrangements. The web integrated IVR 304 is coupled to a web server 307, which can reside on the internet 308. The internet 308 further includes an overlaid internet service provider (ISP) 309. The ISP 309 includes a connection to a plurality of computers, and providing these computers with a connection to the internet 308. The computer 310 is intended to show a variety of methods by which the calling party can use a computer to connect to the internet 308, each of which, among others, can be used in conjunction with the present disclosure. The computer 310 first shows a standard dial-up or DSL appliance. Here the computer 310 is shown connected to the ISP 309 through the PSTN 301. The second type of connection shows the computer 310 having a direct connection to the ISP 309, without the PSTN. With respect to the telephone service providers, this connection may represent a cable modem or ethernet. The final connection shown is a wireless system, whereby the computer 310 is connected via radio frequency to a base station 311. The base station 311 in turn can be connected to the ISP 309, as shown, or directly to the internet 308.

This embodiment illustrates one embodiment, among others, of the present disclosure whereby the telephone service provider also acts as a call center for the desired called party. In this embodiment the web integrated IVR 304 resides on the secured intranet 303. When the PSTN 301 receives a call to the desired called party, it queries the application server 302 for subscriber specific handling instructions. The application server 302 responds by instructing the PSTN 301 to connect the call to the web integrated IVR 304. The web integrated IVR 304 then sends a query to the accessibility server 305 to determine whether there is an accessible internet connection associated with the calling party, and the internet protocol (IP) address of the internet connection. There is an accessible internet connection when the calling party computer 310 has registered over the internet 308 with the accessibility server 305. The accessibility of an internet connection in one embodiment depends upon the presence and availability of an internet connection. According to an exemplary embodiment, presence relates to the presence of the computer being connected to the internet, while availability relates to the current availability or preference of the user. As one skilled in the art will recognize, these fields may be customized to provide alternative accessibility standards. If there is no accessible internet connection associated with the calling party, the web integrated IVR 304 sends the standard IVR menu to the calling party.

If there is an internet connection associated with the calling party, the web integrated IVR 304 sends a prompt to the calling party. The prompt includes informing the calling party that a web user interface (WUI) format menu is available, and asks if the calling party would like to use the WUI format menu. If the calling party does not choose to use the WUI format menu, the web integrated IVR 304 sends the standard IVR menu to the calling party telephone 300. If the calling party would like to use the WUI format menu, the web integrated IVR can retrieve the calling party computer 310 internet protocol address and send it to the web server 307.

The web server 307 can then initiate a session with the calling party computer 310. The session can be initiated by sending the calling party computer 310 a URL, inviting the calling party to select the URL to initiate the session. A chat client can be used by the web server and the calling party computer to facilitate the sending of the URL to the calling party computer 310. Alternatively, the session can be initiated by using push technology to "push" the URL or the first web page of the WUI to the calling party computer 310. Push technology, alternatively known as "webcasting," relies on an application residing on the subscriber's computer to initiate a push session whereby updates are requested by the application at regular intervals set by the user. As one skilled in the art will recognize, many push clients currently exist, and each of these push clients are intended to be included within the present disclosure.

Once a session has been initiated, the web server 307 will send a web page to the calling party computer 310. Each of the WUI format menu web pages sent to the calling party computer 310 can duplicate the voice menu voice prompts. Thus, each web page sent to the calling party computer 310 depends upon the calling party's answer to the previous question. Alternatively, the WUI format menu web pages can be different from the voice menu in order to take advantage of the graphical format of the web interface. Moreover, the WUI format menu can be customized for each particular user, depending upon the profile of that user.

The web integrated IVR 304 can receive the information from the web server 307, and after the WUI format menu has been completed, the web integrated IVR 304 can adjust customer profile databases accordingly. Alternatively, the web integrated IVR 304 could use the responses received from the calling party in order to instruct the application server 302 to connect a call from the calling party telephone 300 to a desired called party or service representative telephone 312. The application server 302 then instructs the PSTN 301 to connect a call between the parties. In one embodiment, among others, the desired called party or service representative telephone 312 may include a connection to a data network 313. The data network 313 can be enabled to pass the information received from the web integrated IVR 304 to the service representative. This could enable the service representative to more efficiently deal with the calling party.

Figure 4:
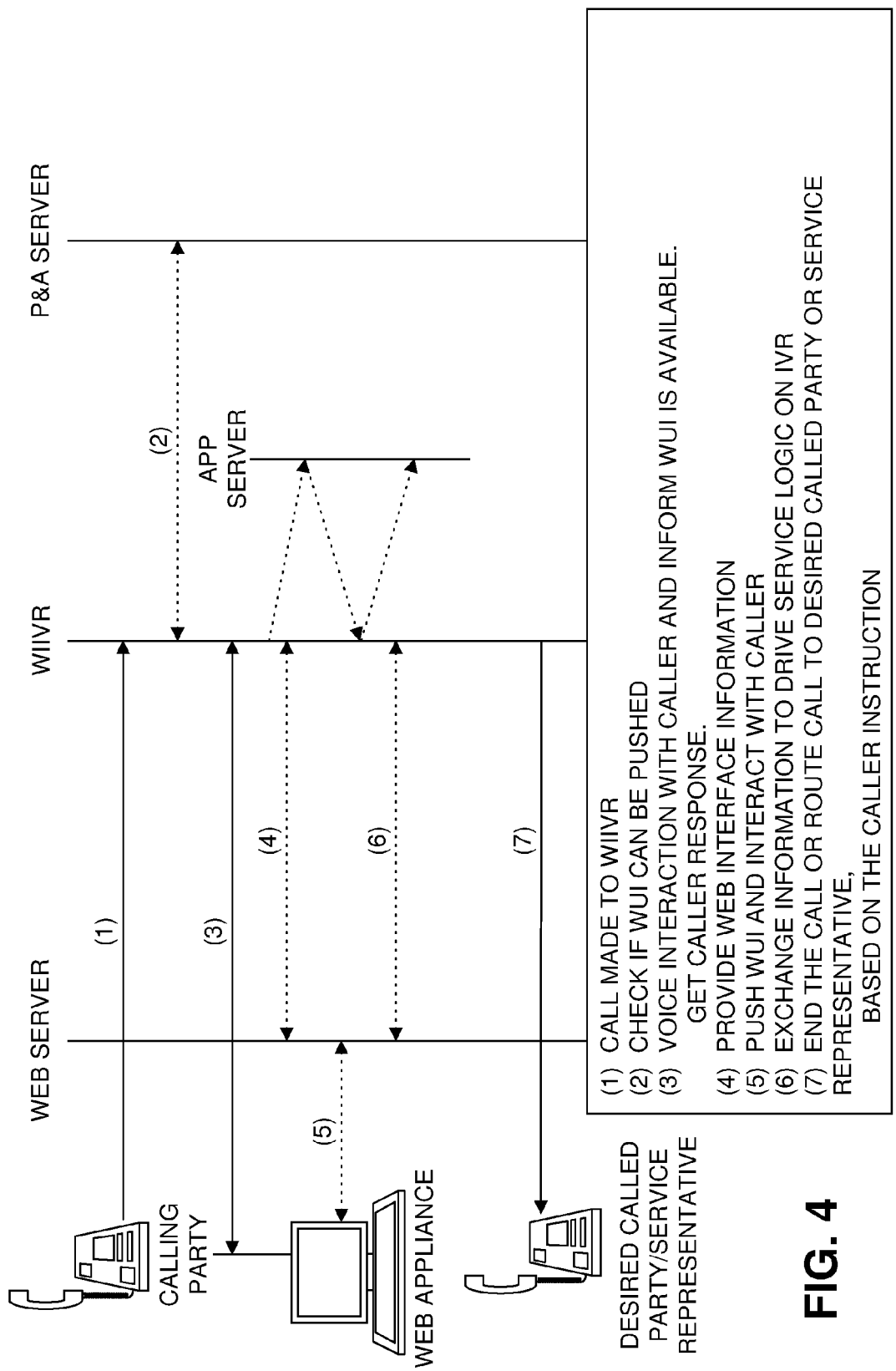
FIG. 4 is a call flow diagram detailing the operation of the embodiment shown in FIG. 3.

Referring now to FIG. 4, shown is a call flow diagram detailing the operation of the system shown in FIG. 3. First a call is placed to the web integrated IVR 304 by the calling party. In this step, the calling party dials a telephone number corresponding to a telephone address of the web integrated IVR, thus making a call request. The SSP residing on the PSTN 301 receives the call request, and queries the application server 302 for handling instructions. The application server 302 responds with handling instructions and the SSP can connect the call to the web integrated IVR 304.

In the next step, the web integrated IVR 304 checks to determine if the WUI format menu can be pushed to the calling party. The WUI format menu can be pushed to the calling party only if there is an accessible internet connection associated with the calling party. An accessibility server 305 maintains database 306 including a list of all registered subscribers, such that the web integrated IVR 304 can query the server 305 in order to find the status of the calling party with respect to internet connectivity. The accessibility of an internet connection in this embodiment is determined according to whether or not a computer 310 is present on the network 308, and whether or not a user is available at the computer 310. However, in alternative embodiments, the accessibility of an internet connection could be made contingent upon a number of other circumstances, including preference of the user.

The third step uses voice interaction to notify the calling party that a WUI format menu is available, and asks for the caller's preference on using the WUI format menu. Similar to a standard IVR system, the web integrated IVR 304 plays a pre-recorded message (understood to include other types of prompts as well) to the calling party. The pre-recorded message includes notification of the WUI format availability and asks the calling party if the WUI format menu is preferred. The web integrated IVR 304 then awaits the calling party response prior to performing the next step.

The fourth step involves requesting that the web server 307 establish a session with the calling party. To do this, the web integrated IVR 304 passes the web server 307 information about the calling party. The information passed can include the calling party computer's IP address, the calling party's name, and the calling party's customer profile.

Next, the web server 307 pushes the WUI format menu to the calling party computer 310 and interacts with the calling party. According to an exemplary embodiment, push technology involves the use of an application running on the calling party's computer. It allows another computer to send information to the computer without the explicit request for the information. The information pushed to the calling party computer could include a URL or a web page. The WUI format may include a series of menus similar in substance to the IVR system menus.

After completing the interaction with the calling party computer 310, the next step involves the web server relaying the information compiled to the web integrated IVR. Finally, the call is ended, or the web integrated IVR 304 routes the call to the desired called party or service representative 312 based on the calling party's instructions. In order to route the call, the web integrated IVR 304 may notify the application server 302 or an SSP that a call should be connected between the calling party and the desired called party or service representative 312.

In alternative embodiments, among others, the web integrated IVR 304, upon receiving updates from the calling party can adjust the customer profile as recorded at the application server 302 according to the calling party's instructions. Furthermore, the web integrated IVR 304 may be enabled to exchange information regarding the calling party responses to the WUI format menu to the desired called party or service representative 312 upon connection. Thus, the desired called party or service representative 312 will be better able to efficiently assist a calling party with questions about service or other problems.

Figure 5:
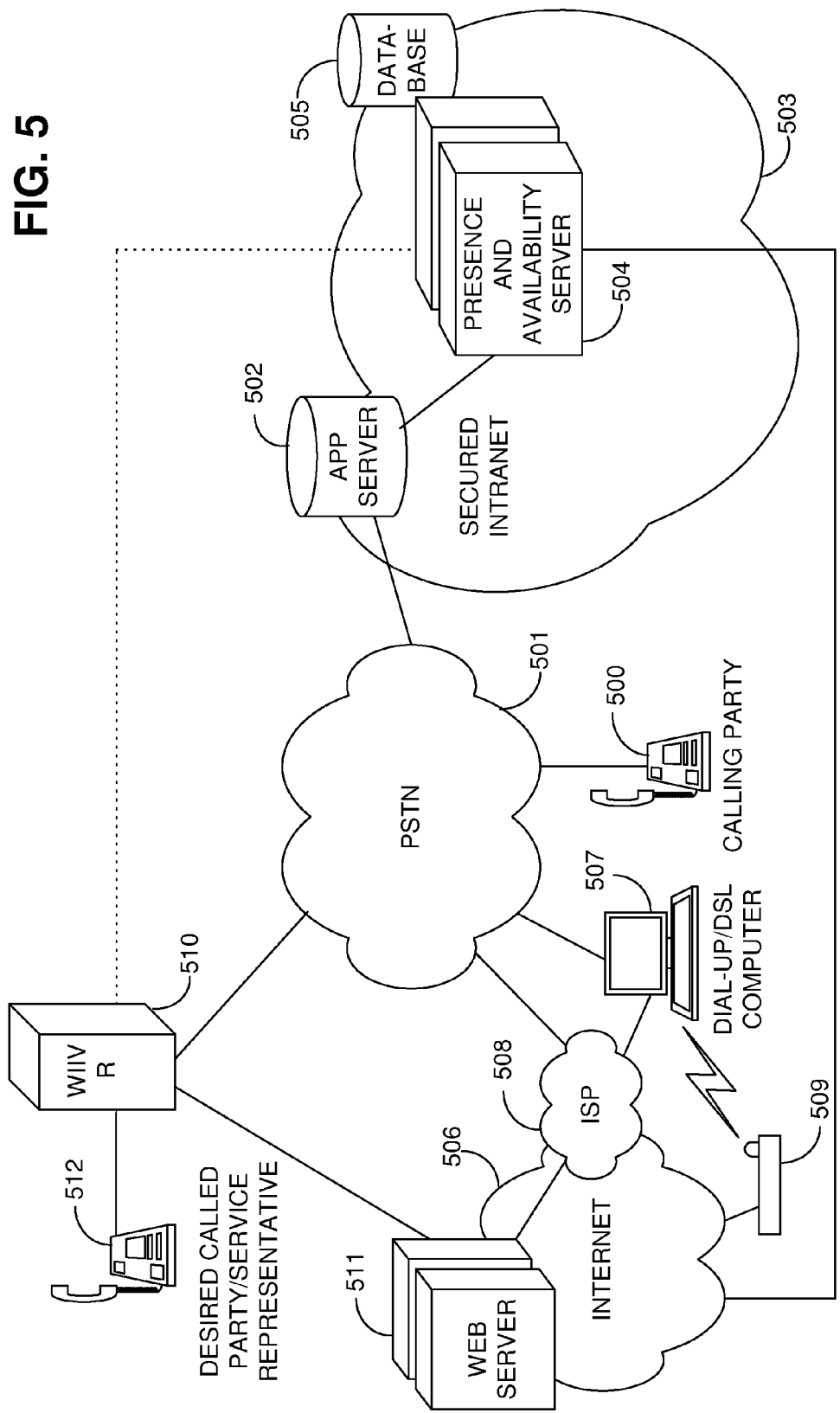
FIG. 5 is a schematic diagram illustrating a second embodiment, among others, of the present disclosure.

Referring now to FIG. 5, shown is an alternative embodiment of the present disclosure. Again the calling party telephone 500 is coupled to the PSTN 501, which is coupled to the application server 502, which resides on a secured intranet 503, and gives handling instructions to the PSTN 501. The secured intranet also includes an accessibility server 504 and an accessibility database 505. The accessibility server is coupled to the internet 506 and keeps track of the status of a plurality of subscribers' internet connections.

An internet connection can be established from a calling party computer 507 through an ISP 508 over the PSTN 501, such as by using a DSL modem or analog modem. However, an internet connection can be established in numerous ways, such a cable modem, wherein the computer 507 is connected directly to the ISP 508. Further, the computer 507 could be connected directly to the internet, or can go communicate via RF with a base station 509 which is connected to the internet. One skilled in the art will recognize numerous other ways to connect to the internet, each of which is intended to be within the scope of the present disclosure.

In this embodiment of the disclosure, the PSTN 501 is coupled to a private branch exchange web integrated IVR 510 or a web integrated IVR 510 residing with another telephone service provider. The web integrated IVR 510 is coupled to a web server 511 to provide a WUI format menu to calling parties. The web integrated IVR 510 can be further coupled to the accessibility server 504 to retrieve accessibility information and to a desired called party or service representative 512 to ultimately connect the call according to the calling party's instructions. The system shown in FIG. 5 can use a call flow diagram substantially similar to the call flow diagram of FIG. 4 and can operate according to the call flow diagram shown in FIG. 6.

Figure 6:
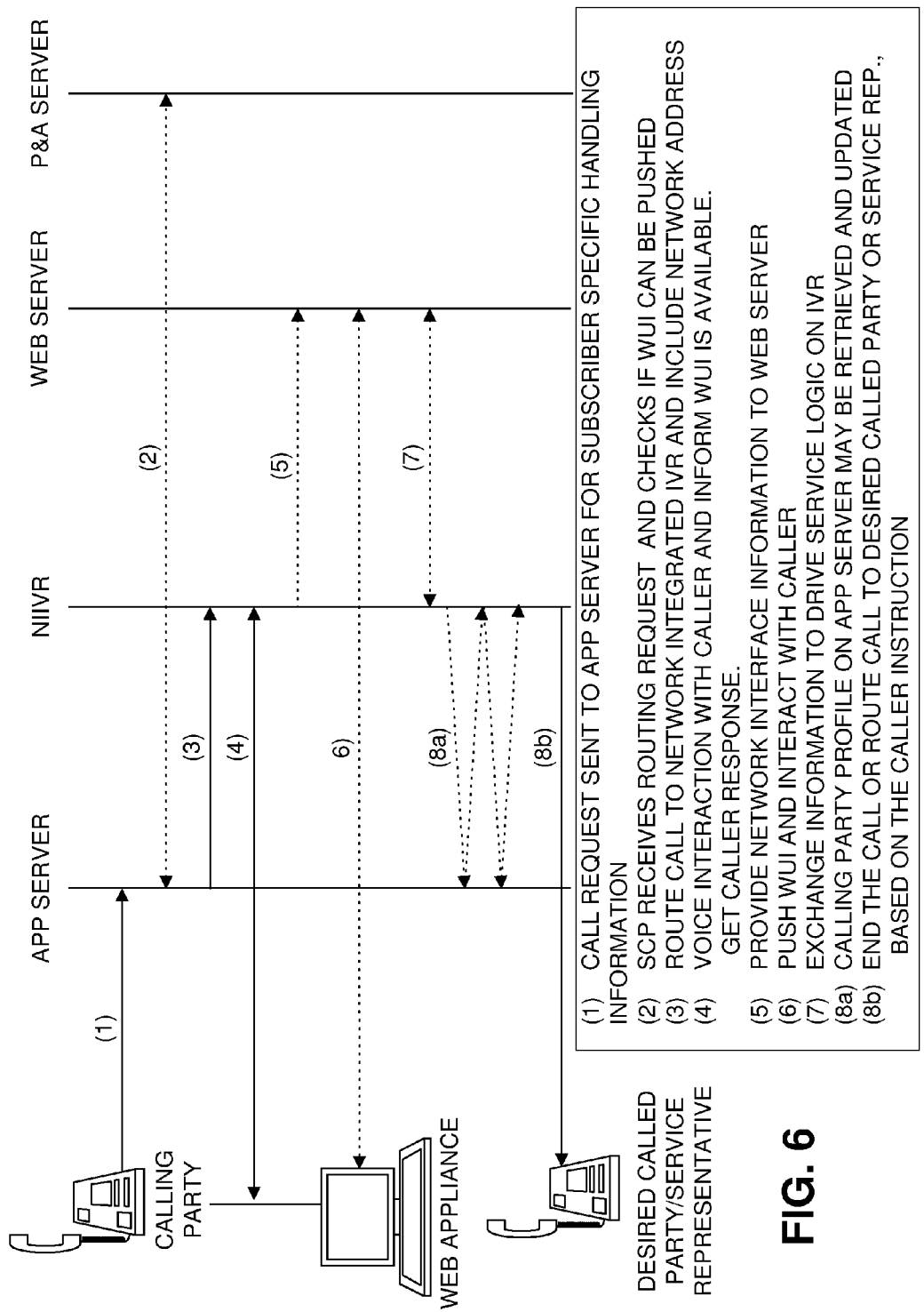
FIG. 6 is a call flow diagram detailing an embodiment, among others, of the operation of the system of FIG. 5.

Referring now to FIG. 6, shown is one embodiment, among others, of a call flow diagram illustrating the operation of the system, as shown in FIG. 5. First a call is made by the calling party to the web integrated IVR 510 system. The call request may be received at the PSTN 501, and the PSTN 501 will query the application server 502 for handling instructions. The application server 502 will check the telephone service customer database to find the handling instructions, and determine to which services the called party subscribes. These services can include an internet accessibility search to determine whether the calling party has an accessible internet connection.

Once it has been determined that that the calling party has an internet connection, the third step is to route the call to the web integrated IVR 510 along with the network address of the calling party. The application server 502 can do this by instructing the PSTN 501 to connect the calling party call request to the web integrated IVR 510 and use a signaling network within the PSTN 501 to pass the calling party information to the web integrated IVR 510.

During the next step in the call flow diagram, the web integrated IVR 510 sends the calling party a pre-recorded message indicating that a WUI format menu is available and elicits a response from the calling party. The pre-recorded message can be a standard IVR message which asks the user whether the WUI format is preferred. The user may respond by pressing a number indicating the user's preference. However, in alternative embodiments, the web integrated IVR 510 may be equipped with speech recognition software that can understand the user's spoken preference.

Provided that the calling party indicates a preference for the WUI format, the web integrated IVR 510 passes the calling party information to a web server 511. The web server 511 generally contains logic enabling the web server 511 to send web pages to a plurality of network users.

The web server 511 in the next step initiates a session with the calling party by sending a WUI format menu to the calling party computer 507 and interacting with the calling party. The session can be established by pushing a whole web page or merely a URL. The pushing may be facilitated by a push application residing on the calling party computer 507, however, it can also be facilitated by a chat client residing on the calling party computer 507.

After interacting with the calling party, the web server 511 sends the information collected from the calling party during the session to the web integrated IVR 510. As one skilled in the art will recognize this step can occur during the web server interaction with the calling party. Moreover, the web server 511 may receive instructions from the web integrated IVR 510 to determine which web pages are sent to the calling party computer 507.

In the eighth step, the web integrated IVR 510 can update the calling party's profile on the application server 502 according to the calling party's instructions. In addition the web integrated IVR 510 can end the call or route the call to the desired called party or service representative 512 based on the calling party's instructions. Moreover, as one skilled in the art will recognize, either or both of these functions can be performed at the end of the calling party's interaction with the web integrated IVR 510.

Figure 7A:
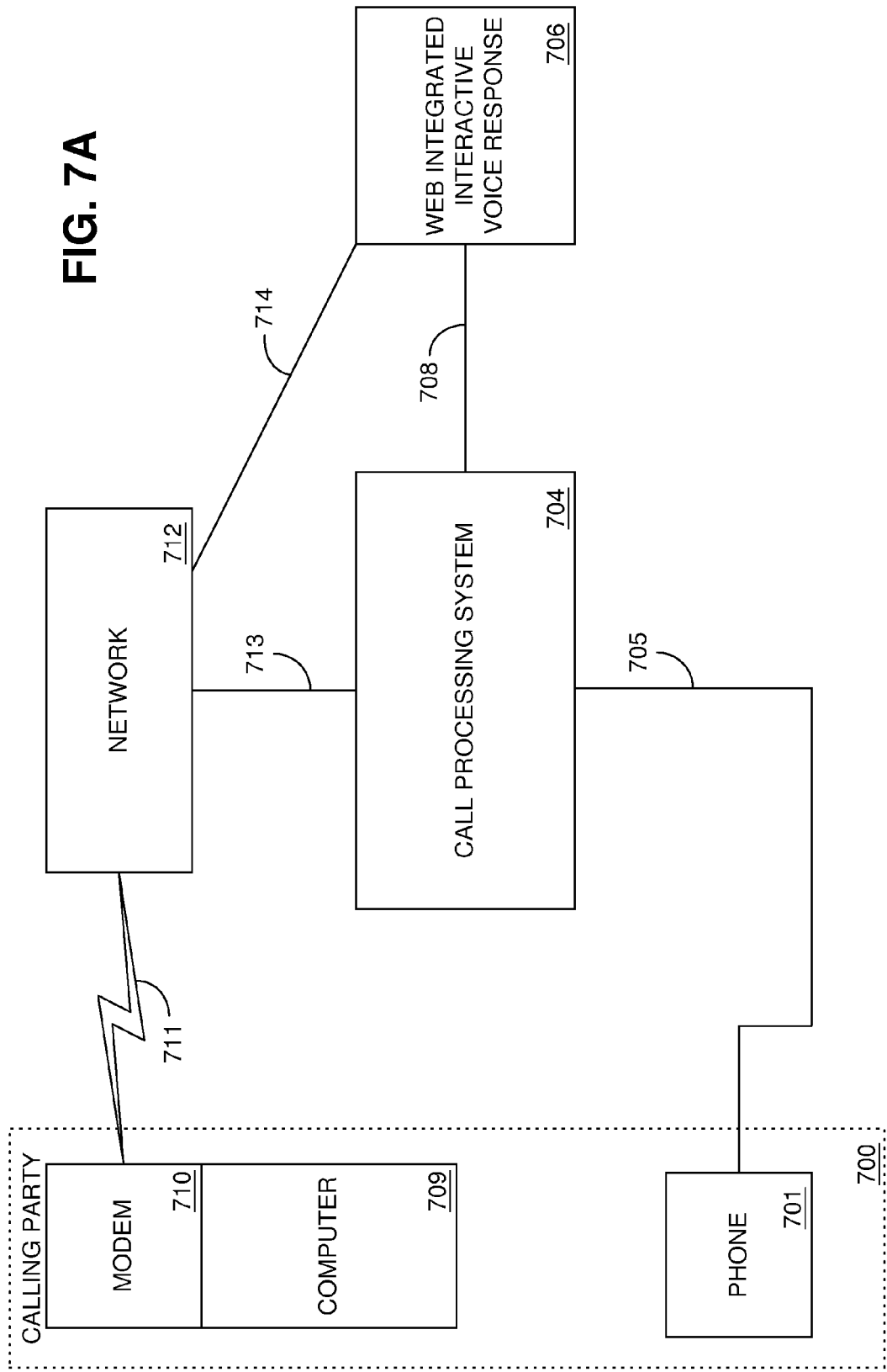
FIG. 7A is a block diagram illustrating one embodiment, among others, of a communication system of the present disclosure.

Referring now to FIG. 7A, shown is a block diagram of one embodiment, among others, of the present disclosure. In this embodiment, a calling party location 700 includes a telephone 701. The telephone 701 may be coupled to a call processing system 704 via connection 705. The call processing system 704 generally includes a customer database. The customer database can include specific handling information and call routing information. The routing information is used to connect the call to the proper party, while the specific handling information encompasses the individual services to which the calling or called parties subscribe. In one embodiment, among others, of the current disclosure, one of the services can include a call center provided by the telephone service provider. In one embodiment of the present disclosure, the IVR could be a web integrated IVR 706. The telephone 701 may be, but is not limited to, a standard plain-old telephone service (POTS) telephone 701 operating substantially within the POTS frequency range. For example, in some embodiments, the telephone 701 may be a wireless telephone or a network telephone, such as one utilizing voice over internet protocol (VoIP) technology, among others.

As such, in some embodiments, the connection 705 may be, but is not limited to, an Internet connection from a network telephone to the call processing system 704. For example, the telephone 701, in some embodiments, is coupled to a gateway system (not shown) through connection 705 via VoIP technology, for example. The gateway system is operable to connect calls from a network phone to a switching system (not shown). Alternatively, a network telephone 701 may communicate directly with the call processing system 704 over an internet connection via VoIP technology. Further, in some embodiments, the network phone is also operable to display video communications from the Internet in addition to audio communications being transmitted over connection 705.

Figure 7B:
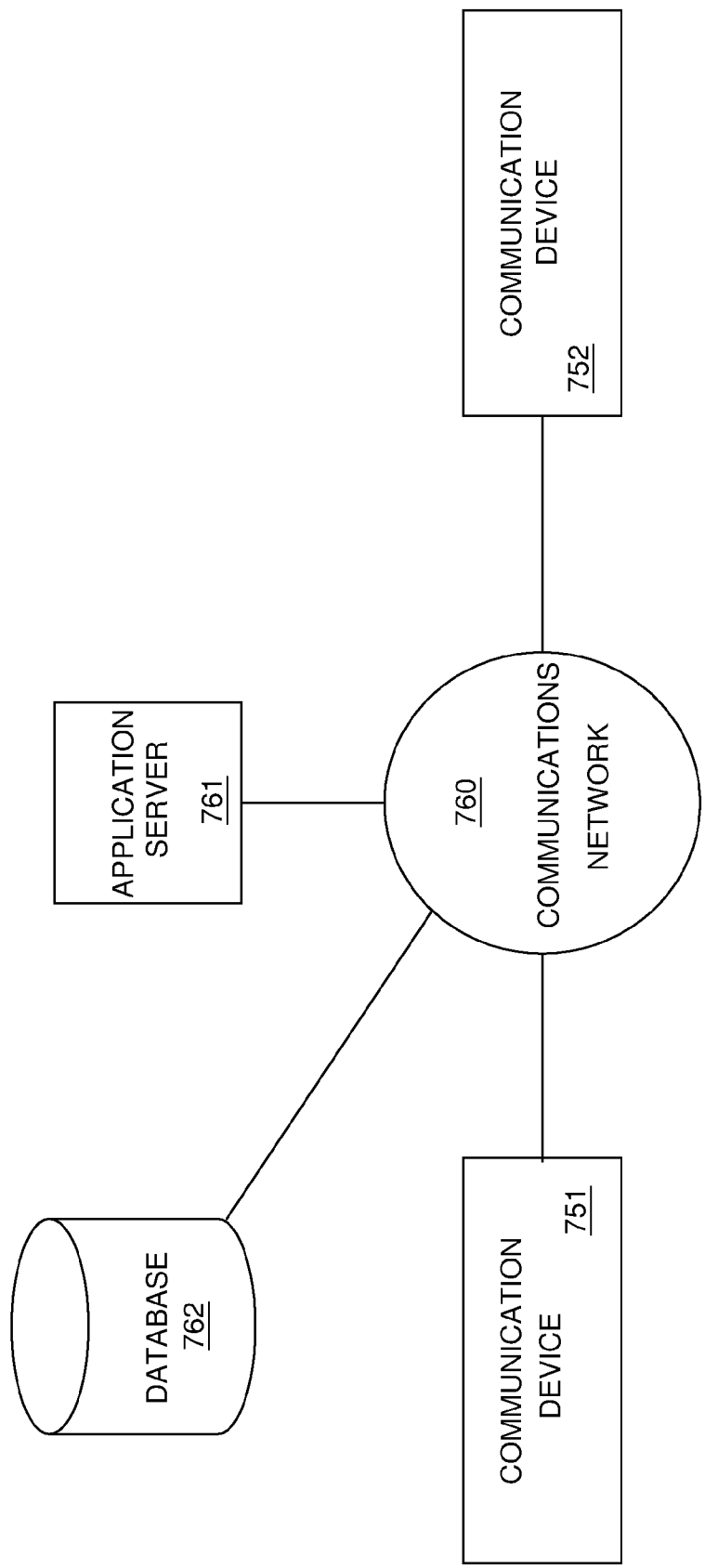
FIG. 7B is a block diagram illustrating one embodiment, among others, of point to point communication system of the present disclosure.

As such, a communication device 751 of a calling party, such as telephone 701, may be involved in point to point communications (e.g., point to point VoIP communications) with a communication device 752 of a called party via a communications network 760, as shown in FIG. 7B. Via an application server 761, a called party, such as an IVR service, is instructed on capabilities of the communication device of the called party, such as to whether the communication device is capable of supporting interactive menus in a graphical format. Accordingly, the application server 761 checks a database 762 maintaining a profile for the called party describing communication devices and services associated with the called party.

Referring back to FIG. 7A, the web integrated IVR 706 can receive incoming calls and provide an interactive voice response service to a calling party. The web integrated IVR 706 can also send queries to the call processing system via line 708. When an incoming call is received, the web integrated IVR 706 can send a query to the call processing system 704 to determine whether or not the calling party has a computer with an accessible connection to the network. As shown, each of the calling party locations in FIG. 7A include a computer 709 having a modem 710 or other network interface, with an accessible connection 711 to the network 712, whether the connection is wireless or wireline based. The network connection may include, alternatively, a standard modem, a cable modem, a digital subscriber line, an ethernet connection, or any other method which provides computer connectivity to a computer network.

The call processing system 704 is coupled to the network 712 via line 713, and can include a database comprising a list of users with accessible network connections. The call processing system 704 can compile this database through a registration application residing on the calling party computer which sends a registration request through the network 712 to the call processing system 704, connected to the network via line 713. The registration application could be a custom application, or even an instant messaging client residing on the calling party computer 709, among others.

Alternatively, the call processing system 704 could receive the query from the web integrated IVR 706, and relay the query to the network 712. However, in order to do this the web integrated IVR 706 should have access to the applicable network database. Furthermore, the web integrated IVR 706 needs a way to map the calling party's telephone number (or other identification) to a network address. The network service provider providing network access to the calling party may include a database that dynamically assigns network addresses to its users as they log on and log off of the network 712. The network service provider will also include other databases, which can correlate a proper name or telephone number with a username, and ultimately to a network address if the user has a computer 709 connected to the network service provider. Thus, the call processing system 704 will be able to query the network 712 using the proper name of the calling party and receive a network address in response if the user is connected and/or receive a telephone number assigned to the user. One skilled in the art will recognize that the web integrated IVR 706 could alternatively send a query directly to the network 712 via line 714 to request information about a particular user's status.

In accordance with one embodiment, among others, of the present disclosure, by knowing the network address being utilized by a user and a telephone number associated with the user, the ability exists to link a voice session utilizing a voice menu format with a graphical session utilizing a web integrated IVR 706. In addition, a user who initiates a voice session via the voice menu format may be prompted to choose to launch an accompanying graphical session via the web integrated IVR 706, while in the midst of the voice session. Therefore, the content of the graphical session can match or correspond to the same point within the current voice session. In some embodiments, a voice session may be detected by the call processing system 704 or web integrated IVR system 706 to be an IP-based voice session, such as one based on VoIP technology. In this case, the web integrated IVR system 706 may launch a graphical session without prompting the calling party, since it is determined that the calling party is utilizing a network device capable of internet communications. Therefore, in some embodiments, a profile of the device being utilized by the calling party during a voice session may determine whether the calling is provided a prompt to choose to launch a graphical session.

Correspondingly, in some embodiments, a user may initiate a graphical session of a web integrated IVR 706 from a web page of a service provider. During the graphical session, the user may further decide that he or she would like to initiate a voice session utilizing a voice menu format also. Accordingly, since the telephone number of the user is associated with the network address of the user, a voice session can be launched and started at the point corresponding to the information being shown in the current graphical session.

Further, in some embodiments, graphical and voice sessions may proceed simultaneously. Therefore, a user may choose to interact using both voice and graphical sessions concurrently or synchronously. As such, each session may be responsive to the other and in sync with the other. For example, if a user opts to talk with a service representative doing a voice session, the service representative also has access to the information being shown to the user and to any information provided by the user via a concurrent graphical session, since the graphical session is tracked via the network address associated with user. Therefore, in some embodiments, a web page provided by the web integrated IVR 706 is associated with information provided in a voice session and is not a standard web page that may be visited by any general user in an internet session. Audio information being provided in a voice session, in some embodiments, is supportive of graphical information being provided in a graphical session and vice versa. Thus, a user may select to participate in a multimodal interactive sessions where information is presented via an audio session and a graphical session. Also, while information provided in a voice session may be presented in a serial format where choices or options are presented in a list or series, information provided in a graphical session may be presented in a non-linear fashion and provide a multitude of options across a variety of subject areas at one time. As such, a graphical session may present more options (and more information in general) to a user than a voice session, in some embodiments.

As previously mentioned, when the web integrated IVR 706 receives a network address signifying that the calling party computer 709 has an accessible network connection, the web integrated IVR 706 can send a voice prompt to the calling party phone 701. The prompt can include a message indicating that there is an accessible network computer 709 and that the menu system is available in either voice menu format and a graphical user interface (GUI) format. Further, the GUI format can automatically be pushed to the computer 109 to facilitate user interaction with the web integrated IVR 706. The web integrated IVR 706 can then request that the calling party choose from one or more options that may include one or more of the following: (a) to continue with a voice menu format (voice session) and not commence with a GUI format (graphical session); (b) to proceed with a GUI format (graphical session) and discontinue the current voice session; (c) to proceed with a GUI format (graphical session) and continue the current voice session; and (d) discontinue the current voice session and not proceed with the graphical session.

Where the calling party chooses to receive the GUI format, the web integrated IVR 706 contacts a web server residing on the network 712. The web integrated IVR 706 notifies the web server that the calling party has requested the GUI format. The web integrated IVR 706 can supply the web server with the network address of the calling party computer 709, or alternatively, the web server itself can retrieve the network address of the calling party computer 709.

In alternative embodiments, the web server could "push" a web page to the calling party computer 709 or send a universal resource locator (URL) to the calling party computer 709. Pushing the web page to the calling party computer 709 can be performed by a "webcasting" application residing on the calling party computer, for example. Pushing a URL to the calling party computer 709 can be accomplished using any of the "push" technologies previously mentioned, or may alternatively be accomplished by merely sending the URL to the calling party computer 709 using any of the chat clients listed previously. The URL would provide the calling party computer 709 a link to the web server. Upon selecting the link, the calling party computer 709 would send a request to the web server, initiating a "pull" connection between the web server and the calling party computer 709. The web server would respond by returning a web page corresponding to the GUI format of the menu system.

In an alternative embodiment, among others, the web integrated IVR 706 can include a system to collect information from the user via the GUI format, and connect the calling party telephone 701 to a correct party, such as a particular service representative, that is capable of handling the calling party's questions or issues. This is done by compiling a database according to the calling party's responses to a series of questions posed by the GUI and answers received by the web server. The web server, after collecting the information, could decide who the calling party should be connected to and notify the call processing system 704 to connect a call to the desired party or service representative via a connection through a switching system (not shown). Alternatively, the web server could notify the web integrated IVR 706 of the responses to the questions posed. The web integrated IVR 706 could then decide the correct disposal of the call and notify the call processing system 704. The call processing system 704 could then instruct a switching system to perform the operation, including the operation of initiating a voice session to accompany or replace a pre-existing graphical session. Moreover, either the web server or the web integrated IVR 706 could be enabled to update a customer database on the call processing system 704, according to the answers received from the GUI format menu system.

In one embodiment, among others, of the current disclosure, one of the services of the call processing system 704 can include a web integrated IVR service. In this embodiment, when a calling party places a call, the call request is received at a switching system. The switching system queries the call processing system 704 for specific handling information. The call processing system 704 then queries a telephone service customer profile database to find the services to which the calling party or called party subscribe.

If the called party subscribes to the web integrated IVR service, the call processing system 704 database has a record that indicates that the called party is an IVR system. The call processing system 704 then checks its own database or, alternatively, a network database for accessibility of a network connection 711 associated with the calling party. If the call processing system 704 does not find an accessible network connection 711, the call processing system 704 instructs a switching system to connect the call to the IVR system for a voice session.

When the call processing system 704 finds an accessible network connection 711, the call processing system 704 preferably sends the calling party a prompt. This prompt can include information about the called IVR system and notification that there is a GUI format menu system corresponding to the called IVR. The call processing system 704 then asks the calling party whether he or she would like to solely use the voice menu format (voice session); use the GUI format (graphical session) instead of the voice menu format; or use the voice menu format (voice session) concurrently with the graphical menu format (graphical session), for some embodiments. If the calling party indicates that he or she would like to solely use the voice menu format, the call processing system 704 instructs a switching system to connect the calling party telephone 701 to the called IVR system. However, if the calling party indicates that he or she would like to use the GUI format, the call processing system 704 instructs a web server to use "push" technologies to deliver a URL or a web page to the calling party computer, or merely send the URL to the calling party via a chat client, among other methods of initiating an interactive session with the calling party computer 709. After receiving the calling party's responses to the GUI, the call processing system 704 may optionally connect the calling party with the desired called party or service representative via a network phone or standard analog phone, as previously mentioned.

In an alternative embodiment, among others, after finding an accessible network connection 711, the call processing system 704 could pass the calling party computer network address to the called web integrated IVR 706 and establish a connection between the web integrated IVR 706 and the calling party telephone 701. The web integrated IVR 706 could then send a prompt to the user indicating the availability of a GUI format menu, and ask the caller to choose between the voice menu format or the GUI format or an interactive session involving both. If the caller chooses the voice menu format, the standard interactive voice response system would be played.

Further, if the caller indicates a preference to use the GUI format, the web integrated IVR 106 sends the network address of the calling party's computer 109 to a web server, which may contain, but is not limited to, a similar menu system to that embodied in the voice menu system. The web server then initiates a graphical session with the calling party by sending a URL or pushing a web page to the calling party computer 109, among others. In alternative embodiments, the calling party 100 may save the URL corresponding to the GUI format menu and use the URL at a later date. After the graphical session has commenced, the voice session may be terminated if the calling party has opted to discontinue the voice session. Otherwise, the voice session continues concurrently with the graphical session, if the calling party opts for an interactive session involving both a voice session and a graphical session.

Further, the web integrated IVR 106 may optionally connect the calling party with the desired called party or service representative 115 via a network phone or standard analog phone, in accordance with a received response to the GUI format menu from the calling party. In addition, if more than one voice or graphical session is active at a time, a user may terminate one of the sessions via options presented on the respective menu formats for the voice and graphical sessions. Correspondingly, if one session is active at a given time, a user may activate an additional session by selecting an option from a respective menu format within a voice or graphical session, in some embodiments.

Note, in some embodiments, a voice menu structure for a voice session may not be the same as a GUI menu structure for a graphical session. Further, the menu structures for respective sessions may allow simultaneous functions. For example, in one embodiment, while a user is involved with a voice session, a GUI format menu in a graphical session may offer the user an option 820 to view the user's last bill, as demonstrated in the web page 810 of FIG. 8. Correspondingly, in some embodiments, a game may be incorporated into the GUI format menu so that a user can play a game while involved in a graphical session.

Further, a user may terminate a voice session (at the beginning or in the middle of the voice session, for example) and continue with a graphical session. Correspondingly, a user may start a voice session from a graphical session if the user chooses, in some embodiments. One pertinent element of this concept is the ability of a voice session (or the underlying logic) to be aware of a graphical session and the linkage of activity between voice and graphical sessions. As such, voice communications over a voice session may correspond to, but not be the same as, information being displayed within a graphical session.

Figure 9:
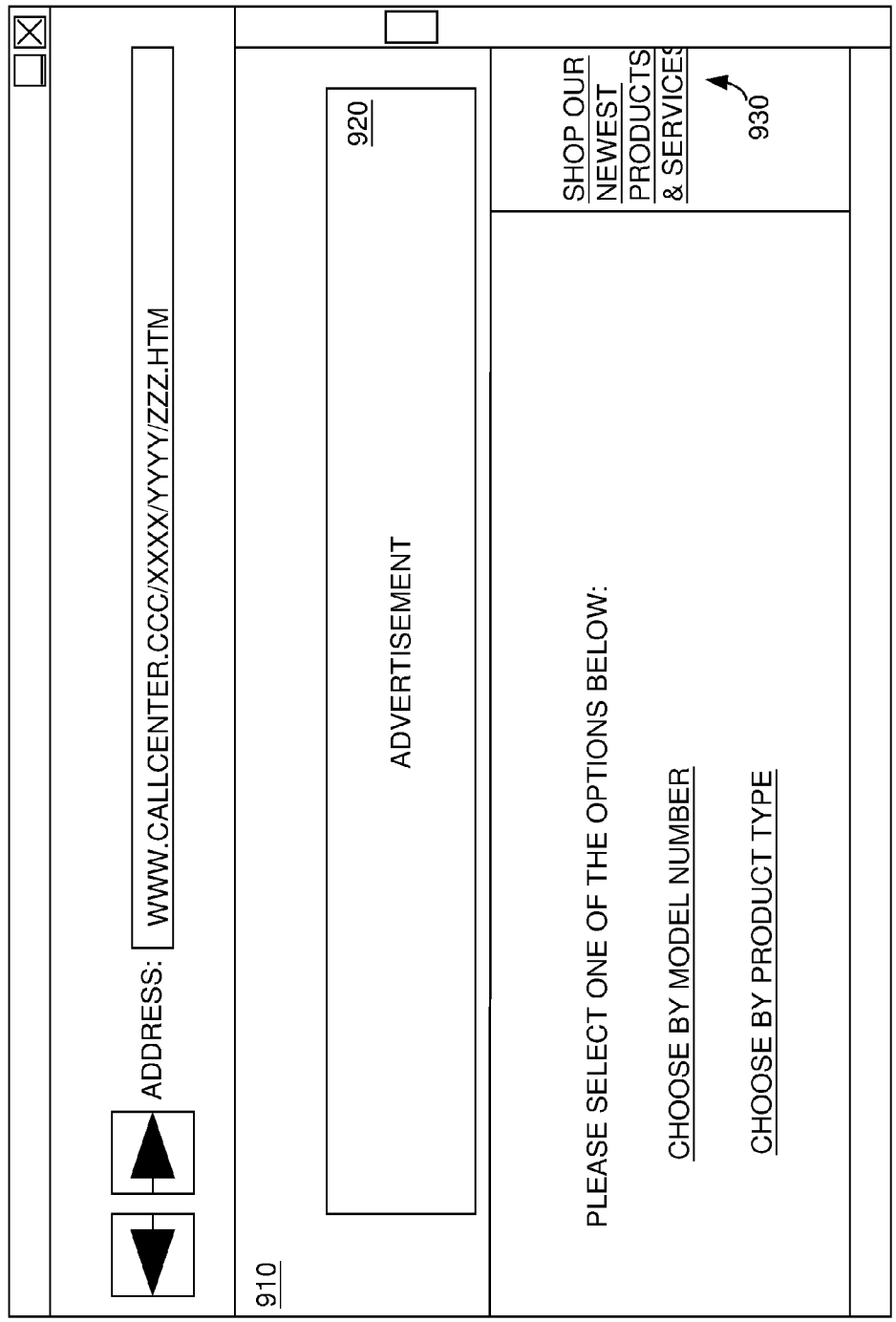

Referring now to FIG. 9, additional features of one embodiment, among others, of a web page 910 for a graphical session includes a GUI format menu featuring advertising options 920 and options 930 for purchasing goods and/or services online. In this way, while a user is involved in a graphical session, the user can also view advertising and/or products/services about which the user may be interested in learning more.

Figure 10:
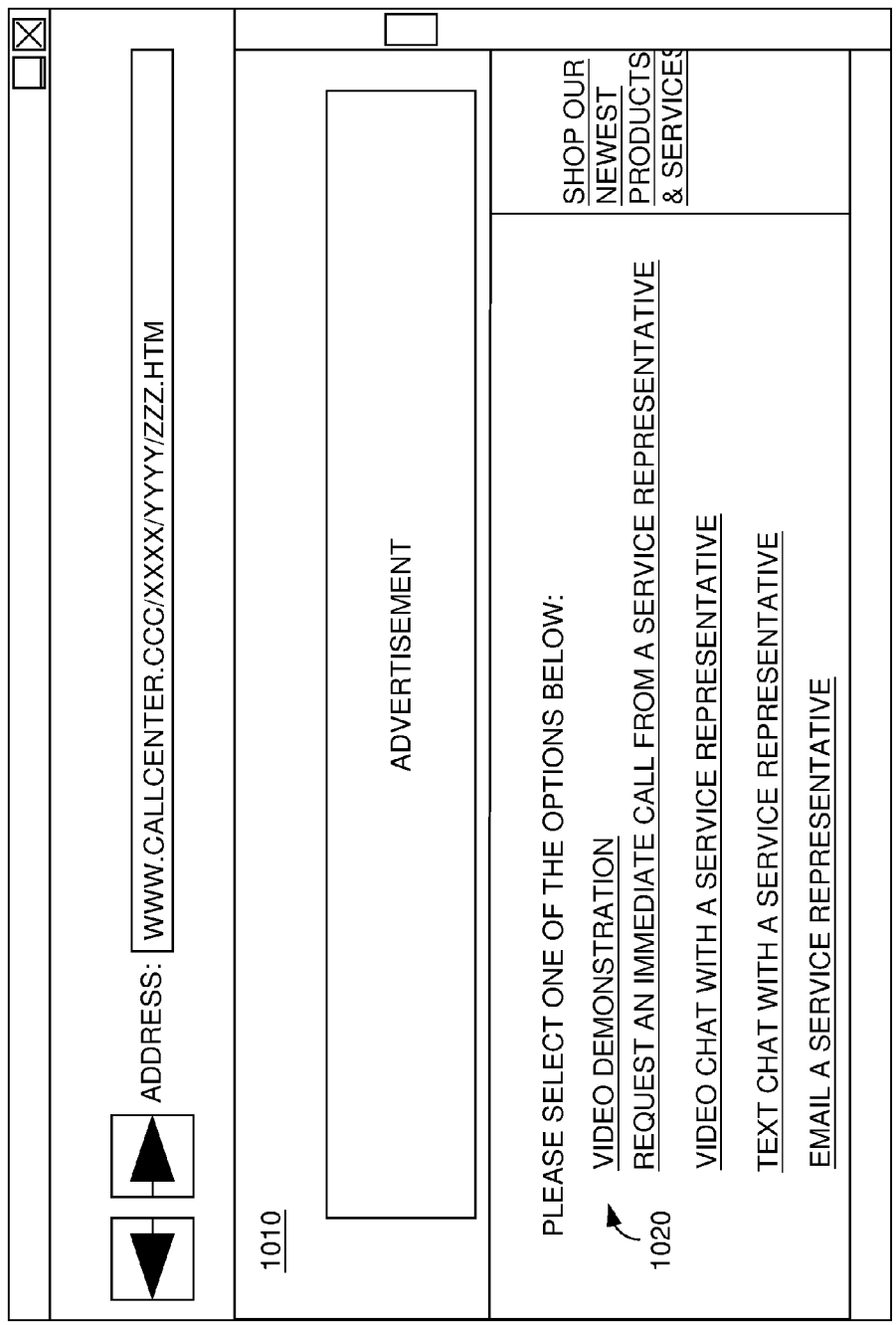

Additionally, GUI format menus can include options 1020 for viewing video clips or transmissions, as shown in a web page example 1010 in FIG. 10, that the user may find helpful. Also, GUI format menus also may, but are not limited to, open multiple windows and initiate programs (chat application, e-mail applications, web browser, instant messaging application, video conferencing tools, flash applications, active applications, etc.) and avatars or graphical representations representing the calling party or the called party (including animated virtual representations). Further, communications between graphical sessions and the web integrated IVR 706 and/or call processing system 704 may be encrypted and authenticated to prevent misuses by unauthorized persons or outsiders to ensure to a user that communications are secure and protected. As such, either the called party or the calling party or both may have to authenticate itself (e.g., providing a password or some other piece of private information) before an interactive session may proceed. Encryption and authentication options may be provided, in some embodiments, for the GUI format menu that are configurable by a user. As such, a user may configure different levels of encryption or authentication to be applied toward the GUI format menu.

Note also, in some embodiments, interactions during an IVR session (whether graphical or voice) are recorded by the web integrated IVR or call processing system 704. This information may be used by a by a called party, such as an IVR system, to update a customer database or may be used by a calling party to document the IVR session.

Figure 11:
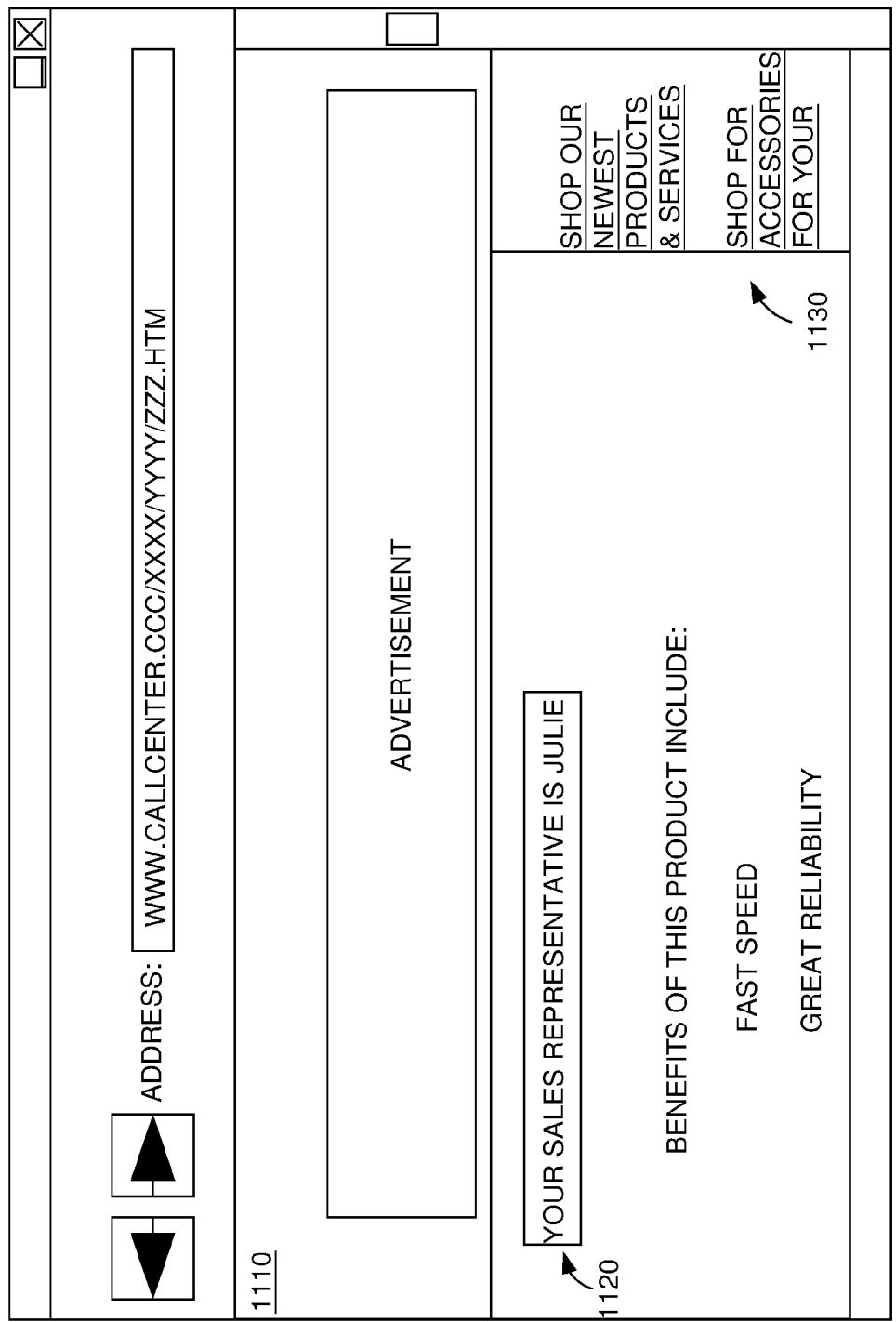

Referring now to FIG. 11, some embodiments of a GUI format menus display information regarding a party who is participating in the communications. In the example 1110 shown, a user is involved in a graphical session with a sales representative named Julie, as indicated in the figure by pointer 1120. Therefore, in one scenario, the user may be talking concurrently or in sync to Julie during a voice session as Julie explains information being shown to the user over the GUI format menu in a graphical session.

Figure 8:
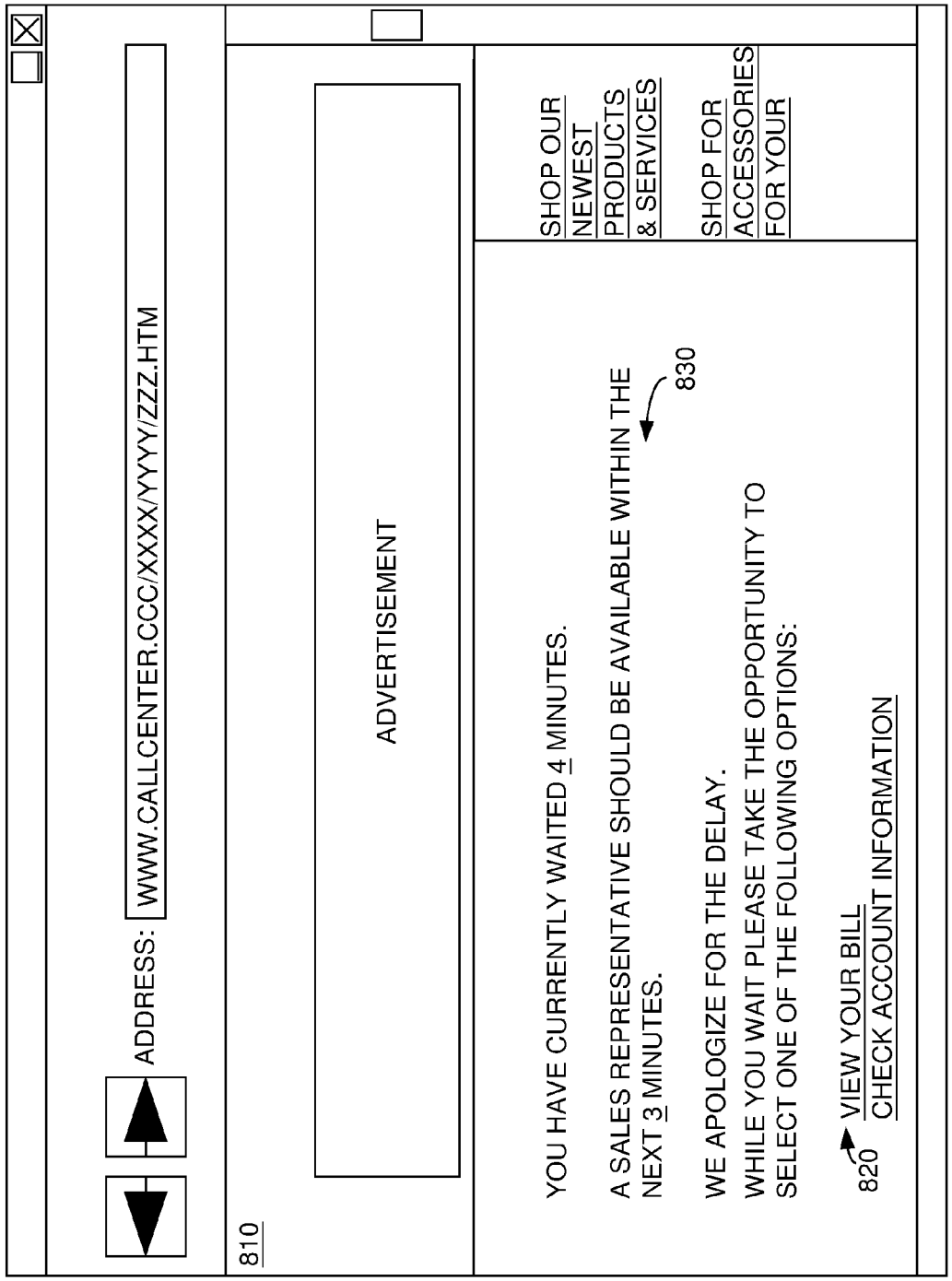
FIGS. 8-12 are diagrams illustrating embodiments of web pages corresponding to GUI format menus.
Figure 12:
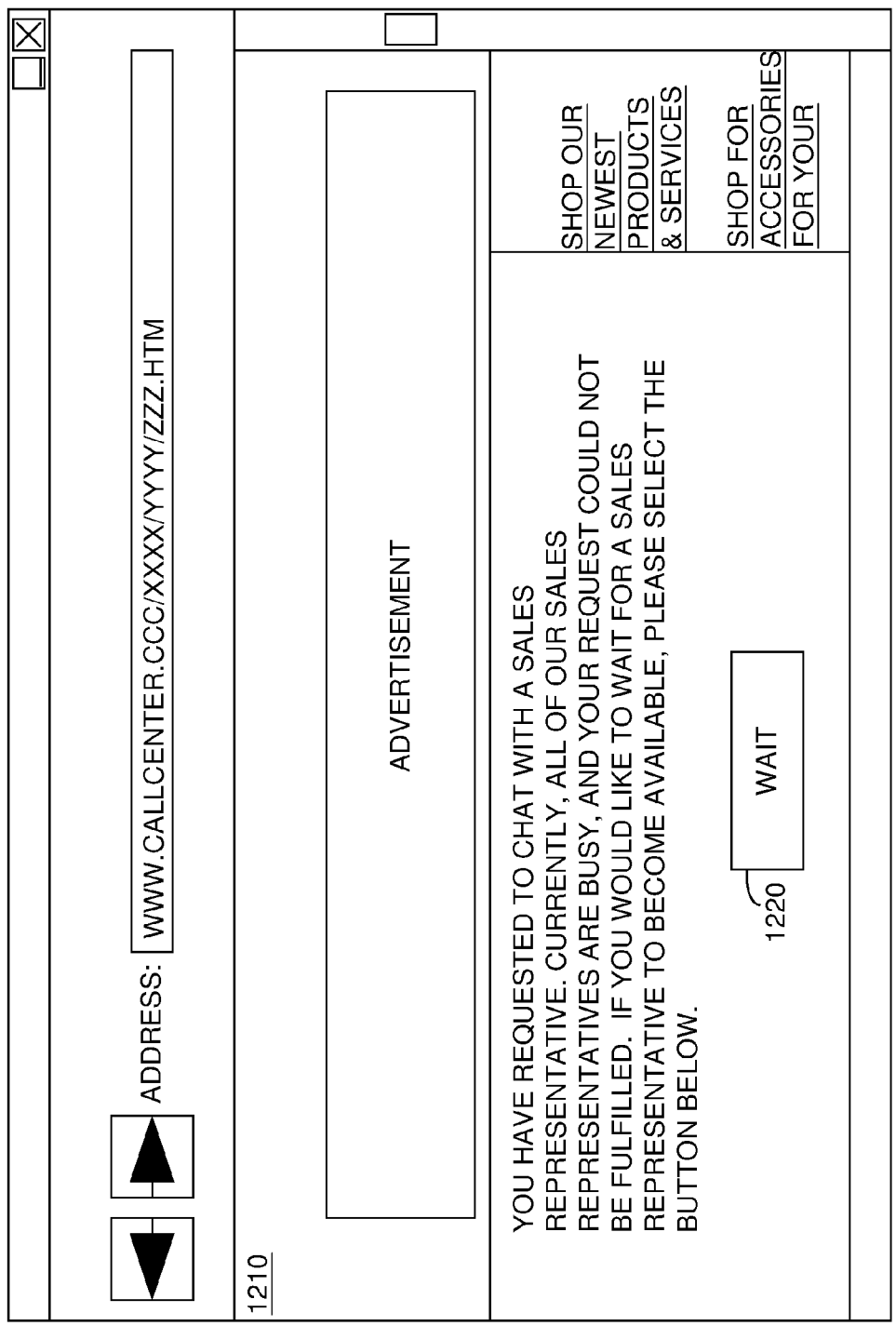

In accordance with one embodiment, if a user requests to communicate with a service representative or some other resource that is temporarily unavailable, a web page corresponding to the GUI format menu system optionally provides a WAIT button 1220, which when selected, automatically places the request on hold and provides an alert either visual, audio or both when the party or resource at the other end of the request is available, as shown in FIG. 12, as an illustrative example 1210. As shown, this feature may include a graphical display of time 830 for how long a user has been waiting and/or how much longer the user is expected to wait, as shown in FIG. 8. In general, sensory feedback (e.g., vibration, sound effects, etc.) may also be used to inform a user of the status of IVR actions. Also, in some embodiments, a user may provide commands or input to the GUI interface format menu via sensory input controls or biofeedback controls (in addition to using a mouse, keyboard, etc.). For example, a user may interact with a GUI interface format menu via signals provided by a user's heart rate, skin conductivity, eye patterns, voice, breathing, etc.

Based on information obtained during an interactive session, a format of an IVR menu may be customized according to a particular user or caller. For example, a web page corresponding to a GUI format menu may be customized according to information provide by a caller during a voice session. Further, a web page corresponding to a GUI format menu may also be customized in accordance with information associated with the source of the call (e.g, call location, phone number, type of call, etc.) or information associated with a customer in one or more databases (e.g., customer database, service database, device database, etc.).

Examples include, but are not limited to, a particular language being used in an IVR menu (whether voice and/or GUI); size of images featured on a web page corresponding to a GUI format menu; and audio volume used in IVR menus and associated web pages; advertising being featured in an interactive session—whether audio or graphical or single mode advertising or multimodal advertising (combination of audio, image, or video communications within a voice session, a graphical session, or both); and personalized options provided in IVR menus (e.g., if a customer purchased a car, then a menu option for repair services is featured).

For example, in one scenario, a calling party may be utilizing a GUI format menu with regard to a product previously purchased by the calling party. Information stored in a database accessible by a web integrated IVR system may show that the calling party had previously purchased the product. This information is accessed and retrieved by the web integrated IVR system. As such a web page corresponding to the GUI menu format system may display a link 1130 offering accessories for sale for the product previously purchased by the calling party, as shown in FIG. 11. Thus, information maintained in a database about a user (e.g., past transactions, personal preferences, address, age, etc.) may be used to customized and control an interactive menu format provided to the user.

Referring now to FIG. 13, shown is a flowchart illustrating one embodiment, among others, of a call flow using the system of FIG. 7A. At step 1300, a first interactive session is established by the web integrated IVR 706 between a calling party and the called party. The first interactive session may be a voice session or a graphical session. As shown by step 1301, the system then determines whether or not a second interactive session can be activated for the calling party. For example, if the first interactive session is a voice session, then the system determines whether a graphical session can be activated for the calling party as a second interactive session or vice versa.

If a second interactive session is capable of being activated, the system then activates the second interactive session, as shown by step 1302. In some embodiments, the calling party may be prompted to choose to activate the second interactive session. Although, in some other embodiments, the second interactive session may be activated automatically by the system.

It should be emphasized that the above-described embodiments of the present disclosure are merely possible examples of implementations set forth for a clear understanding of the principles of the disclosure. Many variations and modifications may be made to the above-described embodiment(s) of the present disclosure without departing substantially from the principles of the present disclosure. All such modifications and variations are intended to be included herein within the scope of this present disclosure.

What is claimed is:

1. A method for providing an interactive response menu to a user, the method comprising:
   sending a graphical user interface format over a network to the user; and
   sending a voice menu format to the user during a continuous communications session in which the graphical user interface format is sent to the user,
   wherein information provided in the voice menu format at least partially matches information provided in the graphical user interface format, and
   wherein the graphical user interface format is sent after the continuous communications session involving the voice menu format is started.

2. The method of claim 1,
   wherein the continuous communications session involves the graphical user interface format and the voice menu format, and
   the method further comprising:
   checking for an accessible network connection associated with the user before sending the graphical user interface format.

3. The method of claim 2, further comprising:
   pushing a web page corresponding to the graphical user interface format to the user based upon a telephone address being utilized by the user.

4. The method of claim 1,
   wherein the continuous communications session involves the graphical user interface format and the voice menu format, and
   wherein the voice menu format is sent after the continuous communications session involving the graphical user interface format is started, the method further comprising:
   prompting the user to choose to interact via the voice menu format from a web page corresponding to the graphical user interface format.

5. The method of claim 4, further comprising:
   routing a telephone call to the user based upon a network address being utilized by the user.

6. The method of claim 1, further comprising:
   customizing information provided in the graphical user interface format according to information maintained in a profile database for the user.

7. The method of claim 1,
wherein the information provided in the voice menu format is responsive to a command provided by a user via the graphical user interface format and vice versa.

8. The method of claim 1, further comprising:
linking a session involving the graphical user interface format with a session involving the voice menu format in the continuous communications session.

9. A non-transitory computer readable storage medium having computer instructions stored thereon comprising a program for providing an interactive response menu to a user, the program causing a computer to perform:
sending a graphical user interface format over a network to the user; and
sending a voice menu format to the user during a continuous communications session in which the graphical user interface format is sent to the user,
wherein information provided in the voice menu format at least partially matches information provided in the graphical user interface format, and
wherein the graphical user interface format is sent after the continuous communications session involving the voice menu format is started.

10. The non-transitory computer readable storage medium of claim 9,
wherein the continuous communications session involves the graphical user interface format and the voice menu format, and the method further comprising:
checking for an accessible network connection associated with the user before sending the graphical user interface format.

11. The non-transitory computer readable storage medium of claim 10, further performing:
pushing a web page corresponding to the graphical user interface format to the user based upon a telephone address being utilized by the user.

12. The non-transitory computer readable storage medium of claim 9,
wherein the continuous communications session involves the graphical user interface format and the voice menu format, and
wherein the voice menu format is sent after the continuous communications session involving the graphical user interface format is started, the method further comprising:
prompting the user to choose to interact via the voice menu format from a web page corresponding to the graphical user interface format.

13. The non-transitory computer readable storage medium of claim 12, further performing:
routing a telephone call to the user based upon a network address being utilized by the user.

14. The non-transitory computer readable storage medium of claim 9, further performing:
customizing information provided in the graphical user interface format according to information maintained in a profile database for the user.

15. The non-transitory computer readable storage medium of claim 9,
wherein the information provided in the voice menu format is responsive to a command provided by a user via the graphical user interface format and vice versa.

16. The non-transitory computer readable storage medium of claim 9, further performing:
linking a session involving the graphical user interface format with a session involving the voice menu format in the continuous communications session.

17. The method of claim 1,
wherein information provided in the voice menu format and information provided in the graphical user interface format is sent simultaneously.

18. The non-transitory computer readable storage medium of claim 9,
wherein information provided in the voice menu format and information provided in the graphical user interface format is sent simultaneously.

* * * * *